H. R. FERRIS.
HAND-TRUCK.
No. 193,401. Patented July 24, 1877.
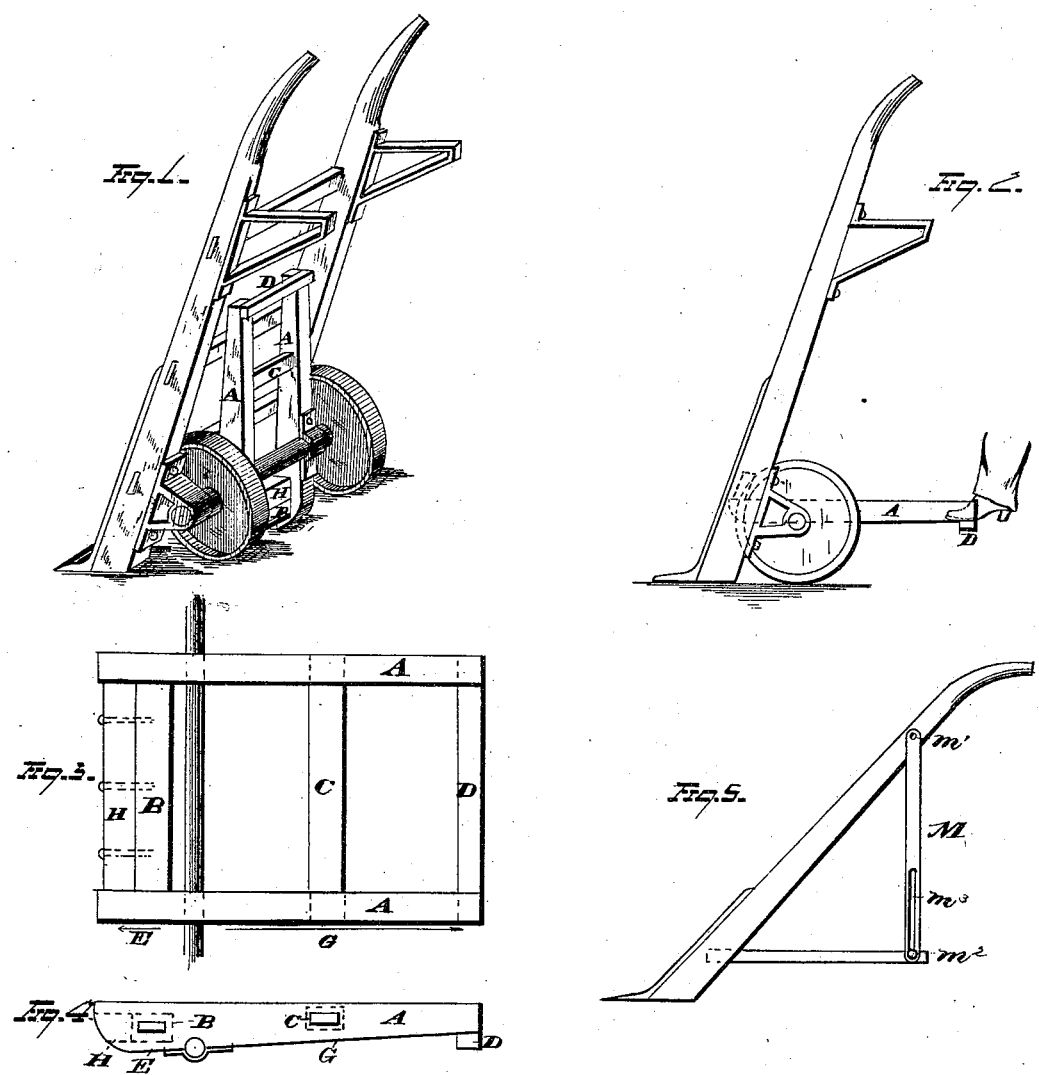
WITNESSES
INVENTOR

UNITED STATES PATENT OFFICE.

HIRAM R. FERRIS, OF CLEVELAND, OHIO.

IMPROVEMENT IN HAND-TRUCKS.

Specification forming part of Letters Patent No. 193,401, dated July 24, 1877; application filed May 25, 1877.

*To all whom it may concern:*

Be it known that I, HIRAM R. FERRIS, of Cleveland, in the county of Cuyahoga and State of Ohio, have invented certain new and useful Improvements in Hand-Trucks; and I do hereby declare the following to be a full, clear, and exact description of the invention, such as will enable others skilled in the art to which it pertains to make and use it, reference being had to the accompanying drawings, which form part of this specification.

My invention relates to hand-trucks; and consists in a foot-lever attachment for the same, as will be hereinafter fully specified and claimed.

The object of my invention is to facilitate the handling of the truck, to render the operation of lowering the truck, or rather the handles of the same, after the load is in position, easier and quicker than can be done without my device.

In the drawing, Figure 1 represents a perspective view of a truck to which my invention is attached, showing it in the closed or inoperative position. Fig. 2 is a side view representing my device in the operative position. Fig. 3 shows a plan, and Fig. 4 a side view, of the same. Fig. 5 represents a modification of my device.

The foot-lever attachment is represented in the drawing as constructed in the shape of a frame, consisting of the side bars or pieces A A and the cross-bars B, C, and D, firmly attached to each other.

This is the construction preferred for several reasons; but if the foot-lever consisted simply of one piece, of greater or less width, arranged either centrally or to one side, it would come within the spirit and scope of my invention.

The said frame is attached to the axle of the truck, and is preferably placed between the wheels of the same. The side bars could, of course, be placed on the axle, or on an extension of the same outside of the wheels; but such a construction would be objectionable for many reasons.

The axle may either pass through holes in the side bars or be attached as shown in the drawing.

The foot-lever can, if desired, be pivoted to the frame of the truck instead of to the axle, either within the wheels or outside thereof. If placed outside of the wheels and pivoted either to the axle or the frame, the lower cross-bar of the truck would require to be extended outside of the side bars of the truck, or else projections would have to be applied to co-operate with the short arm of the foot-lever.

In the drawing, H represents a metal bar attached to the lower cross-bar of the lever, or to the side bars, which serves the purpose of a weight to keep the foot-lever in the position shown in Fig. 1, so that it may not interfere with the movements or handling of the truck when it (the lever) is not in use.

In place of the weight a spring might be used, which would operate to produce the same result; but I prefer the first-described construction, as it is simpler, less likely to get out of order or to be damaged, and is just as effective and certain in its action.

The frame is preferably constructed of a width so that its side bars are pivoted to the axle near the wheels, so that any strain on the axle caused by the lever may fall on the strongest part of the axle, and where it is least likely to bend. This wide construction also affords a greater surface for the foot of the operator. The strain on the axle can, however, be relieved by securing to the under side of the foot-lever, either immediately under the axle or to either side of it, a foot or standard, (one to each side bar,) which will rest on the ground or floor when the lever is lowered, and prevent any bending of the axle.

This precautionary measure will not generally be necessary, as the axles are strong enough to bear the slight strain that the lever can exert on them.

The short and the long arm of the lever are, respectively, represented by the letters E and G, the outer end of the former bearing against the lower cross-bar of the truck when the foot-lever is in its operative position.

If desired, lugs or projections may be placed on the inside of the truck-frame, and the lever may be caused to act against them instead of against the said cross-bar.

The long arm G is constructed of a convenient length to be easily reached and operated by the foot of the operator.

The operation of the device is as follows: When the truck is in the upright position illustrated in Fig. 2, and the lip or nose has been inserted under the article to be lifted, then the operator cants it onto the truck, or brings the truck to a horizontal position by taking hold of the handles, as usual, and, in addition, employs his foot to depress the lever from its inoperative position (shown in Fig. 1) to its operative one, (represented in Fig. 2;) then pulls the handles toward him and throws the weight of his body, through his foot, onto the lever, by which combined operation of hands and foot the truck is much more easily and readily brought to its horizontal position than in the usual well-known manner. It is evident that the fulcrum of the foot-lever is the axle of the truck, and that the fulcrums of both truck and foot-lever coincide. The employment of the foot-lever also dispenses with the necessity of the operator's foot being used to keep the truck in position by placing it against a wheel of the same, for the moment the lever is depressed a pressure is exerted by it downward on the axle, and also forward in a direction opposite to that exerted by the load, thus effectually preventing the truck from moving backward and withdrawing itself from the load. The truck is, of course, brought to its horizontal position by the force applied at the handles and to the foot-lever, the latter acting on the lower cross-bar, while resting on the axle as a temporary stationary fulcrum. The operator, by the use of this device, is also enabled to apply a greater force at the handles, or rather to use his power to greater advantage at that point, as he can stand a greater distance from the truck than in the case where he is obliged to place his foot against a wheel to keep the truck in position. When the operator releases his hold on the foot-lever it returns to its inoperative position on the under side of the truck, where it cannot interfere with either the load or the operation of handling the truck.

Instead of the short arm of the lever acting against the lower cross-bar of the truck, the long arm might be attached to a rod or chain, M, which latter is attached to the truck-frame at $m^1$, so that when the power is applied to the foot-lever the rod or chain M acts to draw downward. The rod M could be provided with a slot, $m^3$, in which the pin $m^2$ of the foot-lever fits, so that the rod and foot-lever could both be folded under the truck.

What I claim is—

1. In combination with a hand-truck, a foot-lever pivoted to the axle of the truck, substantially as and for the purpose described.

2. The combination, with a hand-truck, of a foot-lever constructed to return automatically to its inoperative position on the under side of the truck, for the purpose and substantially as described.

3. The combination, with a hand-truck, of a foot-lever pivoted to the truck, the short arm of which acts against the lower-cross-bar of the truck, substantially as and for the purpose described.

4. The combination, with a hand-truck, of a foot-lever pivoted to the axle of the same, and constructed in the form of a frame, substantially as and for the purpose described.

5. The combination, with a hand-truck, of a foot-lever constructed of the side bars A A and cross-bars B C D, the said side bars of the lever pivoted to the axle of the truck near the wheels of the same, substantially as and for the purpose described.

6. The combination, with a hand-truck, of a foot-lever pivoted to the truck, the long arm of said lever extending back of the axle when the lever is turned down, said lever being constructed to be folded beneath the truck-frame, substantially as and for the purpose set forth.

In testimony whereof I have signed my name to this specification in the presence of two subscribing witnesses.

HIRAM R. FERRIS.

Witnesses:
FRANCIS TOUMEY,
W. E. DONNELLY.